United States Patent [19]
Radcliffe, Jr.

[11] 3,956,734
[45] May 11, 1976

[54] PLATEN HAVING A PRESSURE-RESPONSIVE TRANSDUCING MEANS FOR USE IN A SIGNATURE-IDENTIFYING SYSTEM

[75] Inventor: Arthur J. Radcliffe, Jr., Ann Arbor, Mich.

[73] Assignee: Burroughs Corporation, Detroit, Mich.

[22] Filed: Nov. 18, 1974

[21] Appl. No.: 524,969

[52] U.S. Cl. .................... 340/146.3 SY; 73/432 R
[51] Int. Cl.² .......................................... G06K 9/00
[58] Field of Search .......... 73/432 R, 432 T, 432 A, 73/88.5 R; 340/146.3 SY, 146.3 SG

[56] References Cited
UNITED STATES PATENTS

| | | | |
|---|---|---|---|
| 3,480,911 | 11/1969 | Danna | 73/432 R |
| 3,491,588 | 1/1970 | Yerman | 73/88.5 R |
| 3,541,844 | 11/1970 | Stover | 73/88.5 R |
| 3,563,097 | 2/1971 | Roggenstein et al. | 73/432 R |
| 3,568,044 | 3/1971 | Elazar | 73/88.5 R |
| 3,579,186 | 5/1971 | Johnson et al. | 340/146.3 SY |

*Primary Examiner*—Leo H. Boudreau
*Attorney, Agent, or Firm*—Edwin W. Uren; Charles P. Padgett, Jr.; Paul W. Fish

[57] ABSTRACT

An apparatus which is responsive to the pressure variations inherent in an individual's act of handwriting a signature for generating electrical signals representative of these characteristic pressure variations for use in signature identification systems. The apparatus employs a handwriting surface which is suspended in space and positioned for receiving a handwritten signature by a pair of cantilever arms which extend from a single semi-rigid vertical support member, the vertical support member being provided with a sensing means responsive to the varying strain induced in the support member when an individual is writing his signature on the handwriting surface for generating an electrical signal representative of the pressure variations in said signature.

6 Claims, 6 Drawing Figures

U.S. Patent May 11, 1976 Sheet 2 of 2 3,956,734
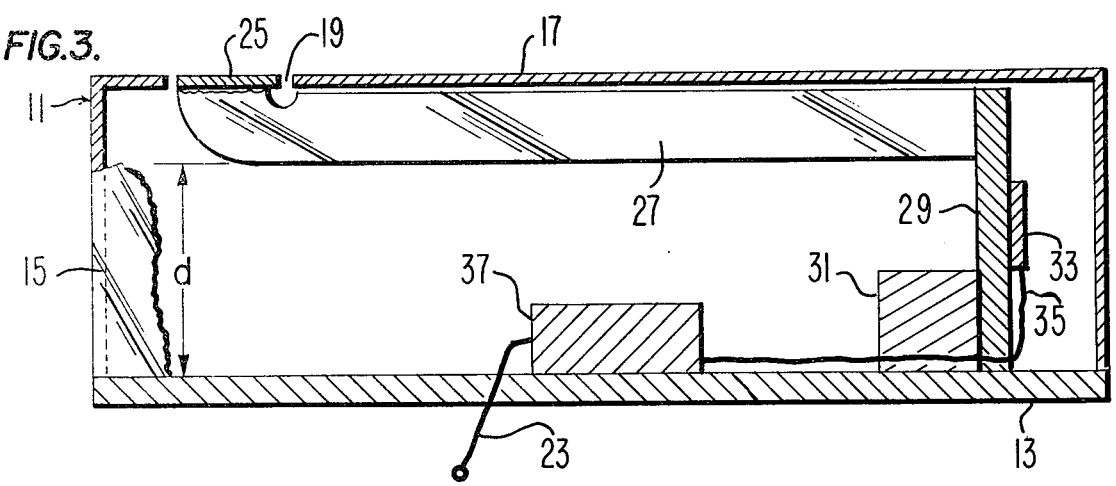
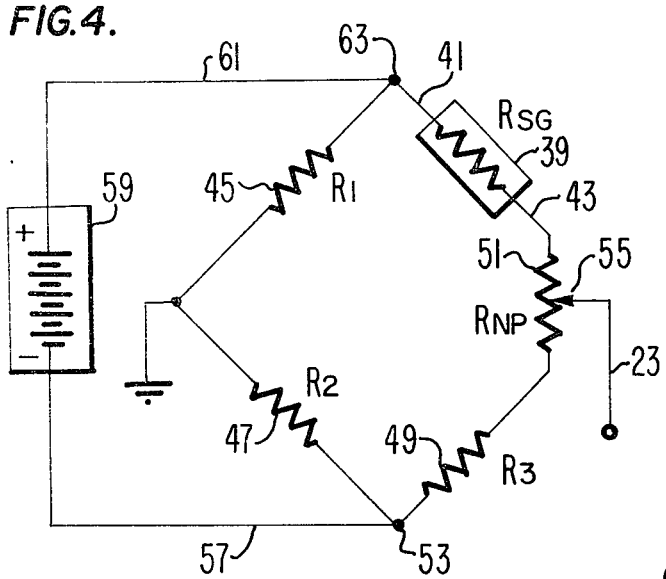
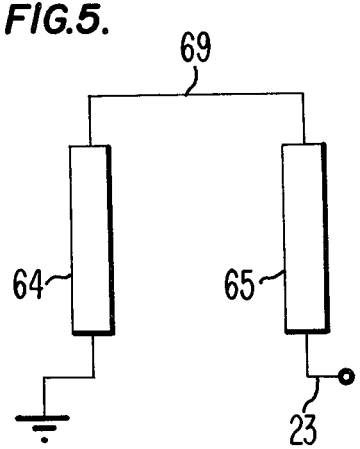
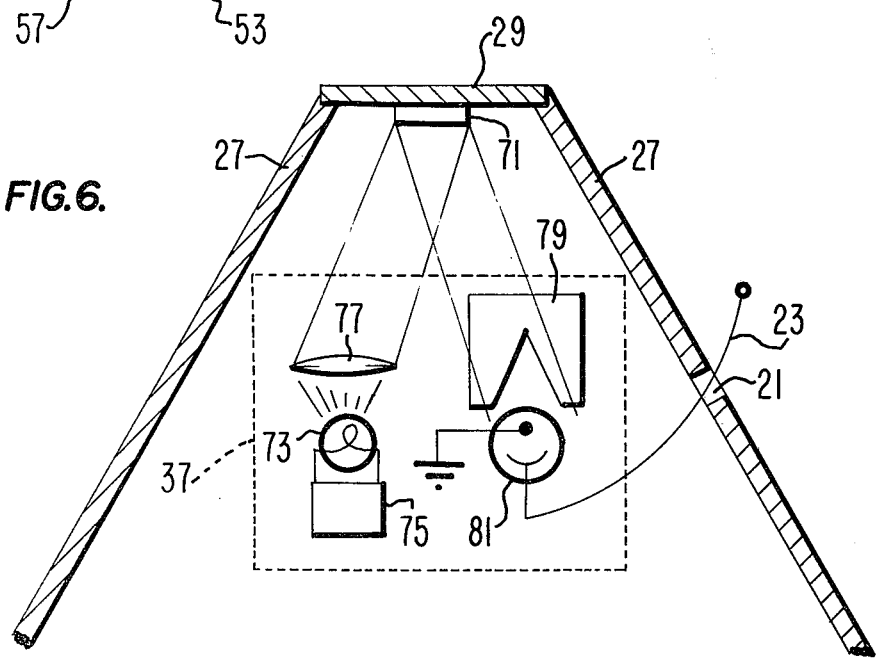

PLATEN HAVING A PRESSURE-RESPONSIVE TRANSDUCING MEANS FOR USE IN A SIGNATURE-IDENTIFYING SYSTEM

CROSS-REFERENCE TO RELATED PATENTS AND PATENT APPLICATIONS

This invention relates to and is useful in a signature identification or verification system such as disclosed in U.S. Pat. No. 3,818,443 to the present inventor entitled "Signature Verification by Zero-Crossing Characterization" and to application Ser. No. 402,723 filed on Oct. 2, 1973 to the present inventor entitled "Method and Apparatus For Signal Spectrum Analysis by Hadamard Transform". This patent and patent application are assigned to the assignee of the present invention and reference is made to the following patents which are also assigned to the assignee of the present invention for a more detailed understanding of the field of use of the present invention: U.S. Pat. No. 3,528,295 to Edwin O. Roggenstein et al. entitled "Graphic Stylus"; U.S. Pat. No. 3,563,097 to Edwin O. Roggenstein et al. entitled "Conversion of Handwriting Into Electrical Signals"; and U.S. Pat. No. 3,579,186 to Robert R. Johnson et al. entitled "Personal Identification Method and Apparatus".

BACKGROUND OF THE INVENTION

Our modern day business environment is replete with examples of business transactions which illustrate the need for being able to distinguish valid signatures from those which have been forged. It was early learned through sad experience that even a careful study of an individual's signature by a merchant or banker is not an adequate safeguard since a skilled forger can often fool anyone who is not an expert. The problem of discerning between a forged signature and a valid signature is a problem which many have attempted to solve in the prior art.

Many of the more modern attempts have sought to solve the problems by using distinct characteristics of an individual's signature which can be detected and converted into electrical signals which can be processed and compared with a representation of an authentic signature for determination as to whether or not the signature currently being investigated is authentic or is a forgery.

One of the characteristics of an individual's signature, which has been the focus of considerable attention, is that of the characteristic pressure applied by the signer during the signing of his signature. While this type of characteristic is not discernable to one who studies the signature on a piece of paper or some document, it can be detected and studied by other means. It has been found that the pressure variations inherent in an individual's act of handwriting his signature are characteristic of that individual's signature and can be used with an acceptable degree of accuracy for verification purposes.

SUMMARY OF THE INVENTION

It is an object of this invention to provide a transducing means for use in a signature verification system.

It is another object of the present invention to provide a means for converting the pressure vvariations inherent in an individual's act of signing his signature into an electrical analog signal representative thereof which can be processed for verification purposes.

It is yet another object of the present invention to provide a relatively simple pressure transducing means employing a minimum of expensive electrical elements and a geometrical shape which provides a maximum of free space for housing other components of the verification system.

It is still a further object of the present invention to provide a vertical support member with a cantilever beam arrangement for supporting a writing surface, and a sensing means responsive to the strain in the vertical support member induced by the pressure variations inherent in an individual's act of signing his signature on the writing area for generating an electrical signal indicative of these pressure variations for further processing in a signature identification or verification system.

It is yet a further object of the present invention to provide a pressure transducing platen for use in a signature verification or identification system which employs a simple geometric structure insuring a maximum of usable space, a minimum of expensive electronic circuitry and a geometrically simple support means so as to result in a relatively inexpensive yet reliable apparatus.

These and other objects and advantages of the present invention are accomplished in an apparatus for converting the pressure variations inherent in an individual's act of signing his signature into electrical signals representative thereof which may be further processed for signature identification or verification purposes. The present apparatus employs a pressure responsive writing surface upon which the individual signs his signature and a single semi-rigid vertical support member which supports the writing surface in a position for receiving the signature by a cantilever beam arrangement. The vertical support is provided with a sensing means which is responsive to the strain induced in the vertical support member. The induced strain varies as the pressure applied to the writing surface is varied and the sensing means produces an electrical signal representative of those pressure variations for use in a signature verification or identification system.

A first embodiment utilizes a single electrical strain gage element affixed to the vertical support member and electrical circuitry for sensing the electrical variations induced in the strain gage by the strain variations in the vertical support for generating an electrical signal indicative of these pressure variations. A second embodiment utilizes a piezoelectric element attached to the vertical support member for producing an electrical signal in response to the strain induced in the vertical support, and a third embodiment utilizes a reflective mirror affixed to the vertical support and optical apparatus responsive to the minute pressure-induced positional changes of the vertical support member for altering the amount of light reaching a photodetector so as to generate an electrical signal indicative of the pressure variations inherent in the individual's act of signing his signature.

BRIEF DESCRIPTION OF THE DRAWINGS

Other objects, advantages and features of this invention will become more fully apparent from the following detailed description, appended claims, and accompanying drawings in which like reference numerals designate corresponding parts:

FIG. 3 is a side elevation of the housing unit of FIG. 2 taken along the line 3—3 of FIG. 2;

FIG. 4 is a schematic diagram of the first embodiment of the present invention wherein an electrical strain gage is affixed to the vertical support member of FIG. 2;

FIG. 5 is a schematic diagram of the second embodiment of the present invention wherein a piezoelectric element is affixed to the vertical support member of FIG. 2; and FIG. 6 is a schematic diagram of the third embodiment of the present invention which employs photo-optical means and a reflective means attached to the back of the vertical support element of FIG. 2.

DETAILED DESCRIPTION OF THE INVENTION

Figure 1:
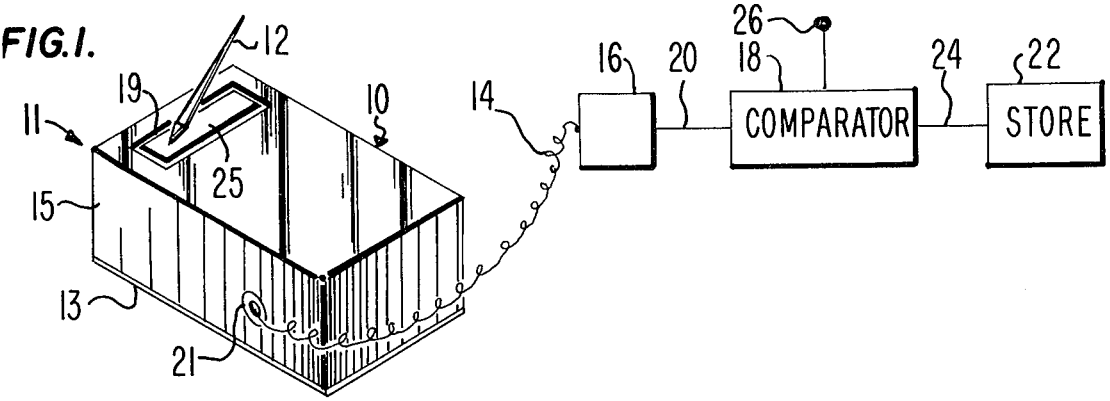
FIG. 1 shows a block diagram of an improved signature identification or recognition system utilizing the pressure transducing apparatus of the present invention.

Broadly stated, FIG. 1 illustrates an improved signature identification system wherein a pressure transducing means 10 is used to convert the pressure pattern of a handwritten signature to be tested into an electrical analog waveform representative thereof. This electrical analog waveform is transmitted from the pressure transducing means 10 via a lead 14 to a waveform processing system represented by block 16. The waveform processing system 16 converts the analog waveform into a comparable representation of the original analog waveform. The comparable representation is supplied to one input of a comparator 18 via lead 20 and the other input of the comparator 18 is supplied with a pre-recorded standard or reference representation from a memory or storage media 22 via lead 24. The comparator is able to determine whether or not an identity exists between the pre-recorded standard and the comparable representation of the original waveform representing the handwritten signature to be tested, and on the basis of this comparison a signal can be generated at the output 26 to indicate whether or not a positive identification of the original handwritten signature has been made.

Figure 2:
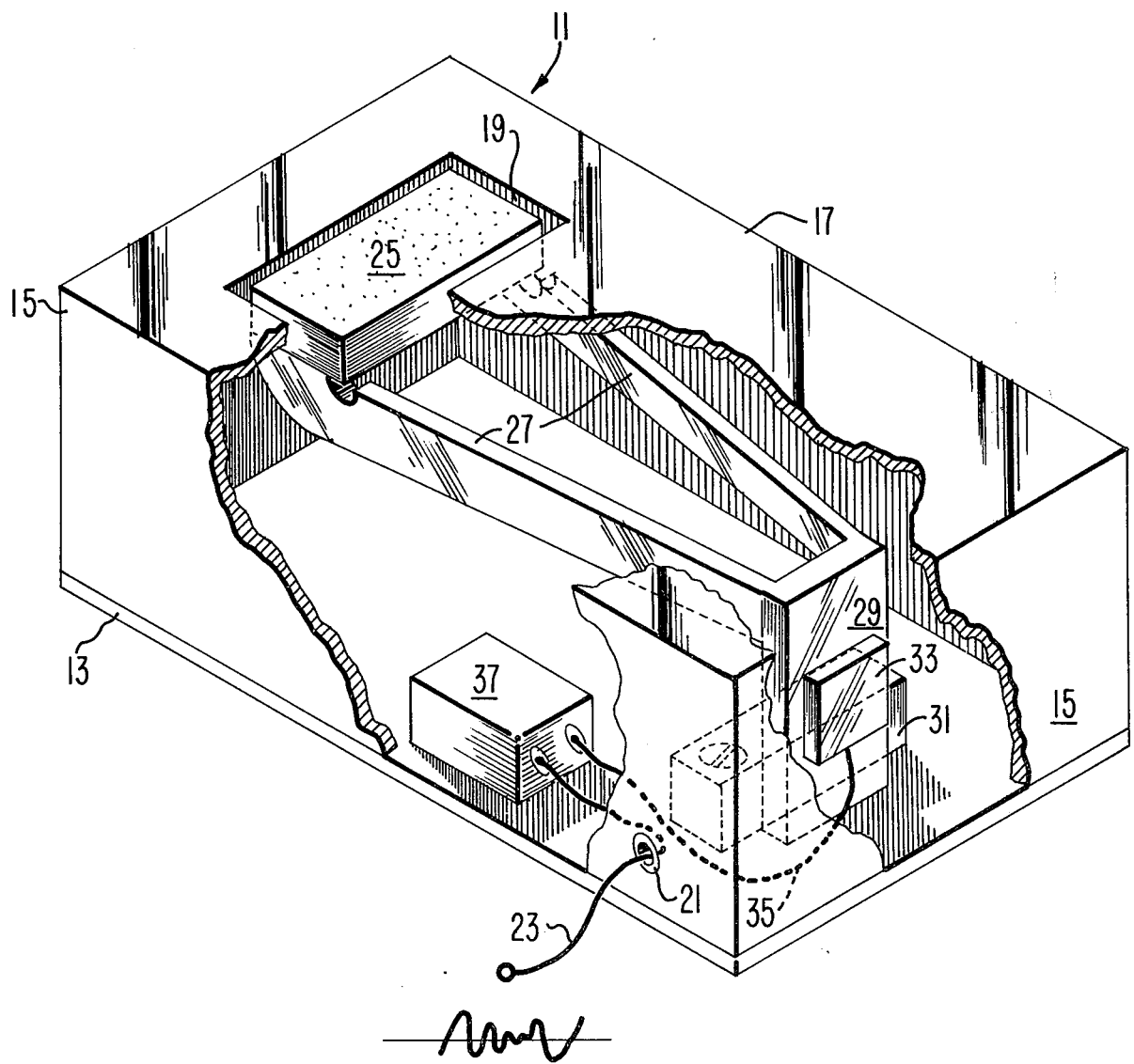
FIG. 2 is a perspective view of the housing unit incorporating the present invention and partly broken away to expose the interior construction thereof.

FIG. 2 illustrates the pressure transducing apparatus of the present invention and shows a generally rectangular, relatively rigid, box-like housing 11 having a rigid base member 13, sides 15, and an upper rigid support surface 17. The upper surface 17 has a slot or opening 19 in the rear portion of the top 17 of the housing 11 and a small opening 21 in one of the sides 15 through which an electrical lead 23, which serves as the electrical output of the present invention, is passed.

Recessed within the opening 19 and substantially flush with the top 17 of the box-like structure 11 is a writing surface or tablet 25 which is positioned in a substantially flushed relation to the upper support surface 17 by a pair of horizontal cantilever beams 27 which are positioned just beneath the underside of top 17. One of the pair of cantilever beams has a first end which is disposed beneath one end of the writing surface 25 and affixed thereto while the other cantilever beam has a corresponding end disposed beneath the opposite end of the writing surface and affixed thereto such that the pair of cantilever beams resides beneath the writing surface, positions it within the opening 19 and supports it therein. The second or opposite end of each of the cantilever beams 27 is affixed to a semi-rigid vertical support member 29 which is firmly attached at its lower end to the base 13 and additionally supported at its lower end by a rigid base support member 31.

In the prime embodiment disclosed herein the vertical support member 29, the cantilever beams, and the writing surface, were constructed from a hard aluminum alloy having a modulus of elasticity of approximately $11 \times 10^6$ psi.

FIG. 2 further shows a flexing sensor means 33 which is affixed to the vertical support member 29 and an electrical coupling 35 which connects the sensor 33 to a subsystem or circuit (as represented by block 37) for generating an electrical signal in response to the flexing in the vertical support member 29 as sensed by the sensor 33 and for generating an electrical signal indicative of the pressure variations inherent in an individual signing his signature and passing said signal via lead 23 for further processing by a signature identification or verification system.

FIG. 3 shows a side view of the box-like housing 11 of FIG. 1 and the contents thereof. The housing structure 11 includes a rigid base member 13, side 15, and an upper support surface 17. The upper surface 17 includes an opening 19 in the rear portion thereof and the base 13 has attached thereto a vertical support member 29 which is firmly supported and anchored to the base by a support member 31. The cantilever beams 27 extend from the upper end of the vertical support member 29 and serve to position a writing surface member 25 within the opening 19 such that the upper surface of the member 25 is in a flush relationship to the top of upper surface 17. Under normal, non-operative conditions, this flush relationship will exist and the end of the cantilever beams 27 which support the writing surface member 25 will be positioned a vertical distance $d$ above the base member 13. As a person signs his signature on the top surface of writing surface 25 or on a paper, or the like, which is positioned thereover, the pressure variations inherent in the person's act of signing his name will cause variations in the distance $d$. Although these variations would normally be unperceivable to the casual observer, they are transmitted via the cantilever beam 27 to the vertical support member 29 and cause a flexing stress or strain therein. This strain is sensed by the flexing sensor means 33 which is connected to a means for converting these sensed variations in stress or strain into electrical signals, as represented by block 37, via coupling 35. Block 37 will then generate an electrical signal which is representative of the pressure variations inherent in an individual's act of signing his signature and will output this electrical signal via lead 23.

A first embodiment of the present invention will be further understood with reference to the schematic diagram of FIG. 4. FIG. 4 illustrates a first embodiment in which the flexing sensor means 33 of the present invention would be comprised of an electrical strain gage 39 or $R_{SG}$. This electrical strain gage element is affixed to either the front or the rear surface of the vertical support member 29 and the leads 41 and 43 which originate at the opposite ends of the strain gage element 39 would correspond to coupling 35 of FIG. 3. The remainder of the schematic of FIG. 4 would be contained within the block 37 of FIG. 3 and would be arranged so that the strain gage element 39 formed one leg of a resistive bridge comprising a first resistor 45 or $R_1$, a second resistor 47 or $R_2$, a third resistor 49 or $R_3$, and a nulling potentiometer 51 or $R_{NP}$. The bridge is constructed such that one end of the strain gage 39 is connected via lead 41 to the first end of the first resistor 45 at node 63. The other end of resistor 45 is connected to ground and to the first end of the second resistor 47. The other end of second resistor 47 is coupled to a junction 53 and then to one end of the third resistor 49. The other end of the third resistor 49 is connected to one side of the nulling potentiometer 51, the other side of which is connected via lead 43 to the second terminal of the strain gage 39. The variable tap 55 of the nulling potentiometer 51 is initially set so as to produce a zero or null signal when the circuit is balanced, this condition corresponding to the normal state of the writing surface wherein its upper surface is flush with the top of surface 17. Any strain which is sensed by the rigid member 29 alters the resistance of strain gage element 39, unbalances the bridge, and causes an electrical signal representative of the pressure variations sensed by the sensing means 33, in this case strain gage 39, to be outputted via lead 23 for further processing. Node 53 which joins the second end of resistor 47 with the first end of resistor 49 is also coupled to lead 57 to the negative terminal of a battery or power supply 59 whose positive terminal is connected via lead 61 to node 63 which is formed where lead 41 of strain gage element 39 is coupled to the first end of resistor 45.

With reference to FIGS. 2, 3 and 4, the operation of the preferred embodiment of the present invention will now be described. When the operator rests his wrist and a portion of his lower arm on support surface 17 and signs his signature on the top of writing surface 25 or upon some media positioned thereover, the pressure variations inherent in the act of signing his signature will generate normally unperceptible variations in the distance $d$ and will cause varying stress or strain to be transmitted via the cantilever beams 27 to the vertical support member 29. The strain gage element 39 which is affixed to one of the flat surfaces of vertical support member 29 will change its resistance in accordance with the flexing or strain being experienced by the vertical support member 29 so as to unbalance the bridge of FIG. 4. This unbalance from the normal null position will cause an electrical signal to occur at the potentiometer tap 55 of the nulling potentiometer 51 and this electrical signal will be passed via output lead 23 for further processing for signature identification or verification purposes.

A second embodiment of the present invention is illustrated with respect to FIGS. 2 or 3 and 5. If the flexing sensor means 33 were a piezoelectric device as shown in FIG. 5 rather than an electrical strain gage as illustrated in FIG. 4, an even simpler circuit would result. A first conductive strip or coating of piezoelectric material 64 could be affixed to either the front or the back surface of vertical support 29 and a second parallel strip or coating of piezoelectric material 65 would be similarly affixed. One end of strip 64 would be coupled to ground through a lead 67 and the other end would be coupled via lead 69 to one end of strip 65. The other end of strip 65 would be connected to output lead 23. In operation, any physical stress or strain experienced by the member 29 would be directly converted to electrical signals by this piezoelectric element and an electrical signal representative of these pressure variations would be outputted on lead 23. In any of the circuits discussed herein, it is understood that the signal appearing on lead 23 is of low magnitude and amplification would be necessary. Such amplification may be obtained from any number of commercially available and well-known transistor amplifiers or the like.

A third embodiment of the present invention will be described with reference to FIG. 6. FIG. 6 shows a top view of a portion of FIG. 2 with the top 17 of housing 11 removed and, in particular, it attempts to show the back surface of support member 29 and the contents of block 37 for the third embodiment of the present invention. A top view of the vertical support 29 is shown and the cantilever arms 27 are shown as extending from the vertical support member 29 toward the writing surface. The block 37 of FIG. 2 is shown as the dotted block 37 of FIG. 6 and the contents of the block are shown within the dotted lines. A mirror or similar reflective element 71 is affixed to the back surface of vertical support 29 such that any physical stress or strain experienced by the vertical member 29 will cause minute motions of the mirror. Block 37 houses a light source 73 energized by a power source 75. The light is focused through a lens 77 so as to impinge upon the mirror 71. The mirror will reflect the light back onto a mask 79 having a slot therein. The slot will only allow a portion of the light to pass through the mask and the amount of light which reaches a photocell 81 will cause the generation of an electrical signal proportional to the amount of light passed by the mask. This generated electrical signal will be passed over the lead 23 for further processing by signature identification or recognition apparatus as known in the art.

In operation, the lamp 73 will be on continually or at least when the apparatus is to be operated and it will cause a beam of light to impinge on the mirror 71. A portion of this light may be reflected back to the mask 79 and passed through the slot to the photocell 81. The photocell will generate an electrical signal and the level of this signal when no pressure is being exerted on the pressure surface 25 will establish a reference level. As a person exerts pressure on the pressure surface 25 while signing his signature, the pressure variations will be transmitted through the cantilever arms 27 back to the vertical support member 29 and the various strains and stresses induced in the vertical arm 29 will result in minor variations in the position of the mirror 71. As the mirror 71 undergoes these minute variations which are directly related to the pressure variations induced by the individual's writing his signature, the light which is reflected back through the slit of mask 79 will be varied. The resulting variations in the amount of light received by photocell 81 will result in variations in the electrical signal which is passed on lead 23 such that the electrical signal which is passed on lead 23 will be representative of the pressure variations which are produced when the individual writes his signature and these electrical signals can be processed for signature identification or recognition purposes as known in the art.

Although specific apparatus has been shown for the purpose of describing applicant's invention, it will be apparent to those skilled in the art that other variations and modifications in the specific structures illustrated may be made without departing from the spirit and scope of the invention which is limited only by the appended claims.

What is claimed is:

1. Pressure transducing apparatus for converting the pressure variations inherent in an individual's act of signing his signature into electrical signals representative thereof comprising:
   a relatively rigid vertical support means;
   horizontal support means having one end attached to the upper portion of said vertical support means;
   writing surface means attached to the other end of said horizontal support means for providing a writing surface upon which an individual may sign his signature; and
   flexing sensor means attached to said vertical support means and responsive to the pressure variations exerted on said writing surface means and transmitted to said vertical support means by said horizontal support means, said flexing sensor means including:
   a first and second vertically oriented strip of piezoelectric material, means for coupling one end of said first strip of piezoelectric material to ground, means for coupling the opposite end of said first strip of piezoelectric material to one end of said second strip of piezoelectric material, and means coupled to the opposite end of said second strip of piezoelectric material for transmitting an electrical signal indicative of the pressure variations inherent in an individual's act of handwriting his signature when the varying stresses or strains in said vertical support member generate varying amounts of current in said strips of piezoelectric material.

2. Pressure transducing apparatus for converting the pressure variations inherent in an individual's act of signing his signature into electrical signals representative thereof comprising:
   a relatively rigid vertical support means;
   horizontal support means having one end attached to the upper portion of said vertical support means;
   writing surface means attached to the other end of said horizontal support means for providing a writing surface upon which an individual may sign his signature; and
   flexing sensor means attached to said vertical support means and responsive to the pressure variations exerted on said writing surface means and transmitted to said vertical support means by said horizontal support means, said flexing sensor means including:
   reflective means mounted on said vertical support means for reflecting rays of light impinging thereon;
   a source of light and means for focusing the light emanating from said source onto said reflecting means;
   masking means having a slot therein for passing only a portion of the light reflected from said reflecting means; and
   photocell means positioned behind said masking means for generating an electrical signal which varys as the amount of light passed by said mask is varied in response to minute movements of said reflecting means caused by the varying stress or strain in said vertical support means caused by an individual's act of handwriting his signature on said writing surface means.

3. The pressure transducing apparatus of claim 2 wherein said horizontal support means comprises a pair of relatively rigid cantilever beam members, one end of each of said cantilever beam members being rigidly attached to opposite sides of the top of said vertical support means and the other end of each of said cantilever beams being attached to said writing surface means for supporting said writing surface and wherein said vertical support means comprises a single relatively rigid vertical member.

4. In a signature identification or verification system wherein an electrical analog waveform representative of the pressure variations which are produced when an individual signs his signature are to be used for signature identification or verification purposes, said system including comparator means, means for storing a representation of an individual's known signature, means for supplying said known representation to one input of said comparator means, processing means for processing said electrical analog waveform to generate a representation thereof, means for supplying said processed representation to the other input of said comparator means, said comparator means operating to compare said stored known representation with said processed representation and having a means for indicating the existence and non-existence of a favorable comparison, an improvement comprising a pressure transducing means for generating said electrical analog waveform comprising:
   means for providing a surface upon which handwriting is to be performed;
   a single relatively rigid vertical support means;
   horizontal support means having one end coupled to the top portion of said vertical support means and the other end positioned to support said writing surface such that minute variations in the pressure applied to said writing surface are reflected through said horizontal support means to produce minute variations in the position of said vertical support means; and
   means at least partially attached to said vertical support means and including a pair of vertically-oriented parallel piezoelectric stripes responsive to the minute positional variations in said vertical support means for generating an electrical analog waveform representative of the pressure variations produced on said writing surface when an individual signs his signature.

5. The improved signature identification system of claim 4 wherein said horizontal support means includes a pair of relatively rigid members each of which having one end coupled to the top portion of said vertical support means and its other end coupled for supporting said writing surface and wherein said vertical support means comprises a single relatively rigid vertical member.

6. In a signature identification or verification system wherein an electrical analog waveform representative of the pressure variations which are produced when an individual signs his signature are to be used for signature identification or verification purposes, said system including comparator means, means for storing a representation of an individual's known signature, means for supplying said known representation to one input of said comparator means, processing means for processing said electrical analog waveform to generate a representation thereof, means for supplying said processed representation to the other input of said comparator means, said comparator means operating to compare said stored known representation with said processed representation and having a means for indicating the existence and non-existence of a favorable comparison, an improvement comprising a pressure transducing means for generating said electrical analog waveform comprising:

means for providing a surface upon which handwriting is to be performed;
   a single relatively rigid vertical support member;
   horizontal support means having one end coupled to the top portion of said vertical support member and the other end positioned to support said writing surface such that minute variations in the pressure applied to said writing surface are reflected through said horizontal support means to produce minute variations in the position of said vertical support member; and
   means for sensing said minute positional variations including:
      a mirror mounted to said vertical support member;
      means for directing a beam of light on the surface of said mirror;
      masking means for passing only a portion of the light reflected from the surface of said mirror; and
      photocell means for receiving the light passed by said masking means and responsive to the amount of light so-received for generating an electrical analog waveform representative thereof, the characteristic pressure variations which are produced at said writing surface when an individual signs his signature operating to produce minute variations in the position of said mirror which is affixed to said vertical support member thereby varying the amount of light received by said photocell means such that said electrical analog waveform is representative of said pressure variations.

* * * * *